United States Patent
Maenishi et al.

(10) Patent No.: US 8,501,102 B2
(45) Date of Patent: Aug. 6, 2013

(54) HYDROGEN GENERATOR AND STARTUP METHOD THEREOF

(75) Inventors: Akira Maenishi, Kadoma (JP); Yukimune Kani, Kadoma (JP); Yuji Mukai, Kadoma (JP)

(73) Assignee: Panasonic Corporation, Osaka (JP)

( * ) Notice: Subject to any disclaimer, the term of this patent is extended or adjusted under 35 U.S.C. 154(b) by 376 days.

(21) Appl. No.: 13/062,471

(22) PCT Filed: Aug. 26, 2010

(86) PCT No.: PCT/JP2010/005262
§ 371 (c)(1),
(2), (4) Date: Mar. 4, 2011

(87) PCT Pub. No.: WO2011/027520
PCT Pub. Date: Mar. 10, 2011

(65) Prior Publication Data
US 2011/0206562 A1 Aug. 25, 2011

(30) Foreign Application Priority Data
Sep. 4, 2009 (JP) ................................. 2009-204268

(51) Int. Cl.
*G05D 23/00* (2006.01)
*B01J 8/00* (2006.01)

(52) U.S. Cl.
USPC ........... 422/109; 422/625; 422/626; 422/627; 422/628; 422/629; 422/105; 422/108; 422/110; 422/111; 48/197 R (58) Field of Classification Search
USPC ......... 422/625–629, 105, 108–111; 48/197 R
See application file for complete search history.

(56) References Cited

U.S. PATENT DOCUMENTS
2004/0144029 A1 7/2004 Miura et al.
2005/0129997 A1 6/2005 Maenishi et al.
(Continued)

FOREIGN PATENT DOCUMENTS
EP 2432061 A1 3/2012
JP 2005-170784 A 6/2005
(Continued)

OTHER PUBLICATIONS
International Search Report for International Application No. PCT/JP2010/005262, dated Nov. 2, 2010, 2 pages.
(Continued)

*Primary Examiner* — Walter D Griffin
*Assistant Examiner* — Lessanework Seifu
(74) *Attorney, Agent, or Firm* — Brinks Hofer Gilson & Lione (57) ABSTRACT

A hydrogen generator is described, which comprises: a material supply device (4); a water supply device (5); an evaporator (10); a reforming catalyst layer (1) for generating reformed gas; a CO removing catalyst layer (2) configured to reduce the amount of carbon monoxide contained in the reformed gas generated by the reforming catalyst layer (1); a combustor (3) for heating the reforming catalyst layer (1) and the CO removing catalyst layer (2); a reforming temperature detector (9) for detecting the temperature of the reforming catalyst layer (1); a heater (7) for heating the CO removing catalyst layer (2); a CO removing temperature detector (8) for detecting the temperature of the CO removing catalyst layer (2); and a controller (16) configured to perform control such that the heater (7) heats the CO removing catalyst layer at the time of start-up and such that if the temperature detected by the CO removing temperature detector (8) becomes greater than or equal to a first specified value, the combustor (3) heats the reforming catalyst layer (1) and the CO removing catalyst layer (2), and if the temperature detected by the reforming temperature detector (9) becomes greater than or equal to a second specified value, the water supply device (5) starts supplying of water.

7 Claims, 2 Drawing Sheets

U.S. PATENT DOCUMENTS

| | | |
|---|---|---|
| 2005/0227129 A1 | 10/2005 | Iio |
| 2009/0130616 A1 | 5/2009 | Schilling et al. |

FOREIGN PATENT DOCUMENTS

| | | |
|---|---|---|
| JP | 2006-219328 A | 8/2006 |
| JP | 3970064 B2 | 6/2007 |
| JP | 2007-217203 A | 8/2007 |
| JP | 2007-335224 A | 12/2007 |
| JP | 4145785 B2 | 6/2008 |
| JP | 2008-156154 A | 7/2008 |
| JP | 2008-218355 A | 9/2008 |
| JP | 2008-247698 A | 10/2008 |
| JP | 2008-303099 A | 12/2008 |

OTHER PUBLICATIONS

International Search Report for International Application No. PCT/JP2010/005262, dated Nov. 2, 2010, 1 page.

Extended European Search Report for European Application No. 10812832.3, dated Nov. 26, 2012, 6 pages.

HYDROGEN GENERATOR AND STARTUP METHOD THEREOF

This application is a 371 application of PCT/JP2010/005262 having an international filing date of Aug. 26, 2010, which claims priority to JP2009-204268 filed on Sep. 4, 2009, the entire contents of which are incorporated herein by reference.

TECHNICAL FIELD

The present invention relates to a hydrogen generator and a start-up method thereof, the hydrogen generator generating gas containing high concentration of hydrogen, using hydrocarbon-based fuel such as city gas (natural gas) and LPG as material gas.

BACKGROUND ART

One known method for generating hydrogen using, as material gas, hydrocarbon-based fuel such as city gas (natural gas) and LPG involves a steam reforming reaction in the presence of a catalyst. In the steam reforming reaction, the material gas and steam are made to react with each other on a reforming catalyst having a high temperature of e.g., 600° C. to 700° C. thereby to yield reformed gas composed of a mixture of hydrogen, methane, carbon monoxide, carbon dioxide, steam and others.

When utilizing the hydrogen of the reformed gas in a fuel cell, carbon monoxide, which causes poisoning of the fuel cell, has to be eliminated from the reformed gas. Therefore, the amount of carbon monoxide is reduced to 10 ppm or less, for example, through a shift reaction in the presence of a shift reaction catalyst or a selective oxidation reaction that is carried out subsequently to mixing with oxygen, utilizing a selective oxidation catalyst. To properly carry out such reactions, hydrogen generators are constructed to select a catalyst type and establish a catalyst temperature and a reaction gas flow condition in which the catalyst can exhibit its strongest reactivity. (see Patent Literature 1 and Patent Literature 2).

Incidentally, exposure to water and carbon deposition are well known as the causes of degradation of the catalysts used in the hydrogen generators. Although steam is necessary for the steam reforming reaction, if steam is supplied to the catalyst when the temperature of the catalyst is not sufficiently high, the steam will be cooled and condensed by the catalyst and the structural elements located about the periphery of the catalyst. The water produced by the steam condensation adheres to the surface of the catalyst and such adhering water infiltrates into the catalyst. The water adhering to the surface of the catalyst causes a change in the composition of the catalyst, adversely affecting the catalytic performance. Meanwhile, the water, which has infiltrated into the catalyst, generates a great power within the catalyst owing to its rapid volumetric expansion when it evaporates within the catalyst during the period of catalyst temperature rise, which would lead to catalyst destruction.

The other cause of catalyst degradation, that is, carbon deposition could occur on the catalyst, inside the catalyst and on the structural elements of the hydrogen generator surrounding the catalyst, if the material gas, which is a carbon-containing hydrocarbon substance, is supplied alone when the catalyst and the structural elements are at high temperatures. If carbon deposition occurs, the active site of the catalyst will be covered with carbon, resulting in a decrease in catalytic activity. Carbon deposition inside the catalyst may cause a decrease in the crush strength of the catalyst itself, which leads to pulverization of the catalyst. Also, carbon deposition may cause blockage in the passage for the gas flowing between the catalyst and the structural element, entailing flow deviation that adversely affects the performance of the catalyst layer on the whole.

One proposal to avoid such undesirable situations is disclosed in the aforesaid Patent Literature 1 according to which the temperature of the steam generator for generating steam is detected and steam is supplied to the reformer after confirming that the steam generator is ready to supply steam. In this arrangement, the catalyst is heated by the burner in the reformer until the steam generator reaches a state in which it can supply steam, but if it is determined that the temperature of the catalyst has been excessively raised to such an extent that carbon deposition occurs, the supply of the fuel gas to the burner is stopped to stop the heating of the catalyst with the burner. This prevents carbon deposition in the catalyst to ensure the durability of the catalyst.

There has been known an alternative operation method for a hydrogen-containing gas generator (e.g., Patent Literature 3). According to this method, in response to a start-up command, a heating process starts to heat the reformer and the shift converter with heaters. After the temperature of the reformer and the shift converter has risen to a level at which carbon deposition due to the thermal decomposition of the desulfurized raw fuel gas as well as steam condensation can be prevented, a steam substitution process is performed to feed steam to the reformer. Sequentially, a processing-object-gas supplying process is performed to feed the desulfurized raw fuel gas and steam to the reformer, upon the reformer temperature reaching a level at which reforming becomes possible. In the operation method for a hydrogen-containing gas generator disclosed in Patent Literature 3, upon start-up of the hydrogen-containing gas generator, the heating process starts in which the reformer is heated with a combustor and the shift converter is heated with a start-up heater.

An alternative reformer for a fuel cell has been proposed (see e.g., Patent Literature 4). This reformer for a fuel cell has a first heater for heating the reforming catalyst and the carbon monoxide removing catalyst through combustion of fuel for use in heating. In this reformer, an electric heater for heating the carbon monoxide removing catalyst is provided in the carbon monoxide removing section and this electric heater is turned ON when supplying the first heater with the fuel for heating. According to the reformer for a fuel cell disclosed in Patent Literature 4, the electric heater is turned ON when supplying the fuel to the first heater, whereby the carbon monoxide removing catalyst is not only heated by the first heater but also heated from the inside thereof by means of the electric heater.

CITATION LIST

Patent Literatures

Patent Literature 1: JP-A-2008-218355
Patent Literature 2: Japanese Patent No. 4145785
Patent Literature 3: Japanese Patent No. 3970064
Patent Literature 4: JP-A-2008-303099

SUMMARY OF THE INVENTION

Technical Problem

The fuel cell power generation system disclosed in Patent Literature 1 however presents the problem that since the supply of the fuel gas to the burner is repeatedly started and stopped when the system starts up, ignition of the burner is also repeated. The ignition of the burner brings about CO emissions at the time of igniting and has the possibility of causing defective sparking by the ignition electrode as well as ignition failure due to the difference between the feed rates of the fuel gas and combustion air. For the sake of stable start-up of a hydrogen generator that is frequently turned ON, the number of ignition operations performed on the burner should be reduced as much as possible.

In configurations such as the cylinder-type steam reformer disclosed in Patent Literature 2 in which the exhaust combustion gas coming from the burner heats the CO shift reaction catalyst layer after heating the reforming catalyst layer, the catalyst in the vicinity of the combustion gas flow passage in which high-temperature combustion gas flows is readily heated but it takes time to heat the catalyst located away from the combustion gas flow passage in cases where the catalysts are heated only by the burner.

In the hydrogen-containing gas generator operation method disclosed in Patent Literature 3, heating of the reformer and heating of the shift converter start at the same time when starting up the hydrogen-containing gas generator. In the reformer for a fuel cell disclosed in Patent Literature 4, since the electric heater is turn ON when fuel for heating is supplied to the heater, heating of the reformer and heating of the carbon monoxide removing catalyst are substantially simultaneously carried out.

Incidentally, the CO removing catalyst has slower reaction speed compared to the reforming catalyst and needs to be used in large amounts. Accordingly, it takes time to heat the CO shift reaction catalyst layer even in the hydrogen-containing gas generator disclosed in Patent Literature 3 and the reformer disclosed in Patent Literature 4. For this reason, there is the possibility that the temperature of the reformer would become higher than a temperature at which carbon deposition occurs (e.g., 500° C. in the case of a catalyst containing precious metal such as Pt and 300° C. in the case of a catalyst containing Ni), before the shift converter is heated to a temperature at which steam condensation can be inhibited. Therefore, even when using the hydrogen-containing gas generator disclosed in Patent Literature 3 or the reformer disclosed in Patent Literature 4, the burner should be repeatedly turned ON and OFF to prevent the temperature of the reformer from exceeding the temperature at which carbon deposition takes place.

As described earlier, the hydrogen generators disclosed in Patent Literatures 1 to 4 require frequent ignition of the burner and therefore have not proved successful in ensuring stable start-up.

The invention is directed to overcoming the foregoing outstanding problems and a primary object of the invention is therefore to provide a hydrogen generator and a start-up method thereof, the hydrogen generator being capable of exhibiting excellent durability and performing stable start-up by restricting water leakage and carbon deposition in the reforming catalyst layer and the CO removing catalyst layer at the time of start-up.

Solution to Problem

In accomplishing these and other objects, there has been provided, in accordance with the present invention, a hydrogen generator comprising:

a material supply device for supplying material;

a water supply device for supplying water;

an evaporator for evaporating the water fed from the water supply device thereby to produce steam;

a reforming catalyst layer having a reforming catalyst for generating hydrogen-containing reformed gas through a reforming reaction using the material and the steam;

a CO removing catalyst layer configured to reduce the amount of carbon monoxide contained in the reformed gas generated by the reforming catalyst layer;

a combustor for heating the reforming catalyst layer and the CO removing catalyst layer;

a reforming temperature detector for detecting the temperature of the reforming catalyst layer;

a heater for heating the CO removing catalyst layer;

a CO removing temperature detector for detecting the temperature of the CO removing catalyst layer; and a controller configured to perform control such that the heater heats the CO removing catalyst layer at the time of start-up and such that if the temperature detected by the CO removing temperature detector becomes greater than or equal to a first specified value, the combustor heats the reforming catalyst layer and the CO removing catalyst layer, and if the temperature detected by the reforming temperature detector becomes greater than or equal to a second specified value, the water supply device starts supplying of water.

This enables it to inhibit water leakage and carbon deposition in the reforming catalyst layer and the CO removing catalyst layer at the time of start-up, so that improved durability and stable start-up can be ensured.

These objects as well as other objects, features and advantages of the invention will become apparent to those skilled in the art from the following detailed description of preferred embodiments with reference to the accompanying drawings.

Advantageous Effects of the Invention

According to the hydrogen generator and start-up method of the invention, water leakage and carbon deposition in the reforming catalyst layer and the CO removing catalyst layer at the time of start-up can be inhibited thereby to enable improved durability and stable start-up.

DETAILED DESCRIPTION OF THE PREFERRED EMBODIMENTS

According to a first aspect of the invention, there is provided a hydrogen generator comprising: a material supply device for supplying material; a water supply device for supplying water; an evaporator for evaporating the water fed from the water supply device thereby to produce steam; a reforming catalyst layer having a reforming catalyst for generating hydrogen-containing reformed gas through a reforming reaction using the material and the steam; a CO removing catalyst layer configured to reduce the amount of carbon monoxide contained in the reformed gas generated by the reforming catalyst layer; a combustor for heating the reforming catalyst layer and the CO removing catalyst layer; a reforming temperature detector for detecting the temperature of the reforming catalyst layer; a heater for heating the CO removing catalyst layer; a CO removing temperature detector for detecting the temperature of the CO removing catalyst layer; and a controller configured to perform control such that the heater heats the CO removing catalyst layer at the time of start-up, and such that if the temperature detected by the CO removing temperature detector becomes greater than or equal to a first specified value, the combustor heats the reforming catalyst layer and the CO removing catalyst layer, and if the temperature detected by the reforming temperature detector becomes greater than or equal to a second specified value, the water supply device starts supplying of water.

The first specified value stated herein is a temperature at which steam condensation does not occur even when steam-containing gas is fed to the CO removing catalyst layer. Although this value is arbitrarily set in accordance with the type and amount of the catalyst that fills the CO removing catalyst layer, it is preferably to set the first specified value to, for example, 100° C. More preferably, the first specified value is set to 150° C. and further more preferably set to 200° C. with a view to satisfactorily inhibiting steam condensation.

The second specified value stated herein is a temperature at which steam condensation does not occur even when steam-containing gas is fed to the reforming catalyst layer. Although this value is arbitrarily set in accordance with the type and amount of the catalyst that fills the CO removing catalyst layer, it is preferably set to, for example, 100° C. More preferably, the second specified value is set to 150° C. in view of satisfactory inhibition of steam condensation.

The above arrangement enables it to inhibit water leakage and carbon deposition in the reforming catalyst layer and the CO removing catalyst layer at the time of start-up, so that improved durability and stable start-up can be ensured.

According to a second aspect of the invention, the controller provided in the hydrogen generator of the first aspect allows the water supply device to start supplying of water if the temperature detected by the reforming temperature detector is not lower than the second specified value and not greater than a third specified value.

The third specified value stated herein is a temperature at which carbon deposition occurs when the material is fed to the reforming catalyst layer and can be arbitrarily set in accordance with the type of the catalyst that fills the reforming catalyst layer. The third specified value is preferably set to 500° C. in cases where the reforming catalyst consists of only a precious metal catalyst such as platinum (Pt) and set to 300° C. in cases where the reforming catalyst contains nickel (Ni) even though it also contains a precious metal catalyst.

This enables it to ensure more reliable inhibition of carbon deposition in the reforming catalyst and, in consequence, more improved durability.

According to a third aspect of the invention, the hydrogen generator of the first or second aspect is of a multiple cylindrical structure and configured such that the evaporator is in abutment with (located adjacent to) the external side of a combustion gas flow passage through which combustion gas from the combustor flows, such that the reforming catalyst layer is disposed on the downstream side of the evaporator; and such that the CO removing catalyst layer is in abutment with (located adjacent to) the external side of the evaporator.

According to a fourth aspect of the invention, the reforming catalyst provided in the hydrogen generator of any one of the first to third aspects contains nickel. This leads to a reduction in the cost of the hydrogen generator.

According to a fifth aspect of the invention, there is provided a start-up method for a hydrogen generator which comprises a material supply device for supplying material; a water supply device for supplying water; an evaporator for evaporating the water fed from the water supply device thereby to produce steam; a reforming catalyst layer having a reforming catalyst for generating hydrogen-containing reformed gas through a reforming reaction using the material and the steam; a CO removing catalyst layer configured to reduce the amount of carbon monoxide contained in the reformed gas generated by the reforming catalyst layer; a combustor for heating the reforming catalyst layer and the CO removing catalyst layer; a reforming temperature detector for detecting the temperature of the reforming catalyst layer; a heater for heating the CO removing catalyst layer; and a CO removing temperature detector for detecting the temperature of the CO removing catalyst layer;

wherein the heater heats the CO removing catalyst layer at the time of start-up; the combustor heats the reforming catalyst layer and the CO removing catalyst layer if the temperature detected by the CO removing temperature detector becomes greater than or equal to a first specified value; and the water supply device starts supplying of water if the temperature detected by the reforming temperature detector becomes greater than or equal to a second specified value.

This enables it to inhibit water leakage and carbon deposition in the reforming catalyst layer and the CO removing catalyst layer at the time of start-up, so that improved durability as well as stable start-up can be ensured.

According to a sixth aspect of the invention, the water supply device employed in the start-up method for a hydrogen generator of the fifth embodiment starts supplying of water if the temperature detected by the reforming temperature detector is not lower than the second specified value and not greater than the third specified value.

This enables more reliable inhibition of carbon deposition in the reforming catalyst and, in consequence, more improved durability.

According to a seventh aspect of the invention, the reforming catalyst employed in the start-up method for a hydrogen generator of the fifth or sixth aspect contains nickel. This leads to a reduction in the cost of the hydrogen generator.

Referring now to the accompanying drawings, the invention will be hereinafter described according to its embodiments. It is apparent that the invention is not necessarily limited to the particular embodiments shown herein. In the accompanying drawings, only the elements necessary for explanation of the invention are selectively shown, whereas other elements are omitted.

First Embodiment

[Configuration of Hydrogen Generator]

Figure 1:
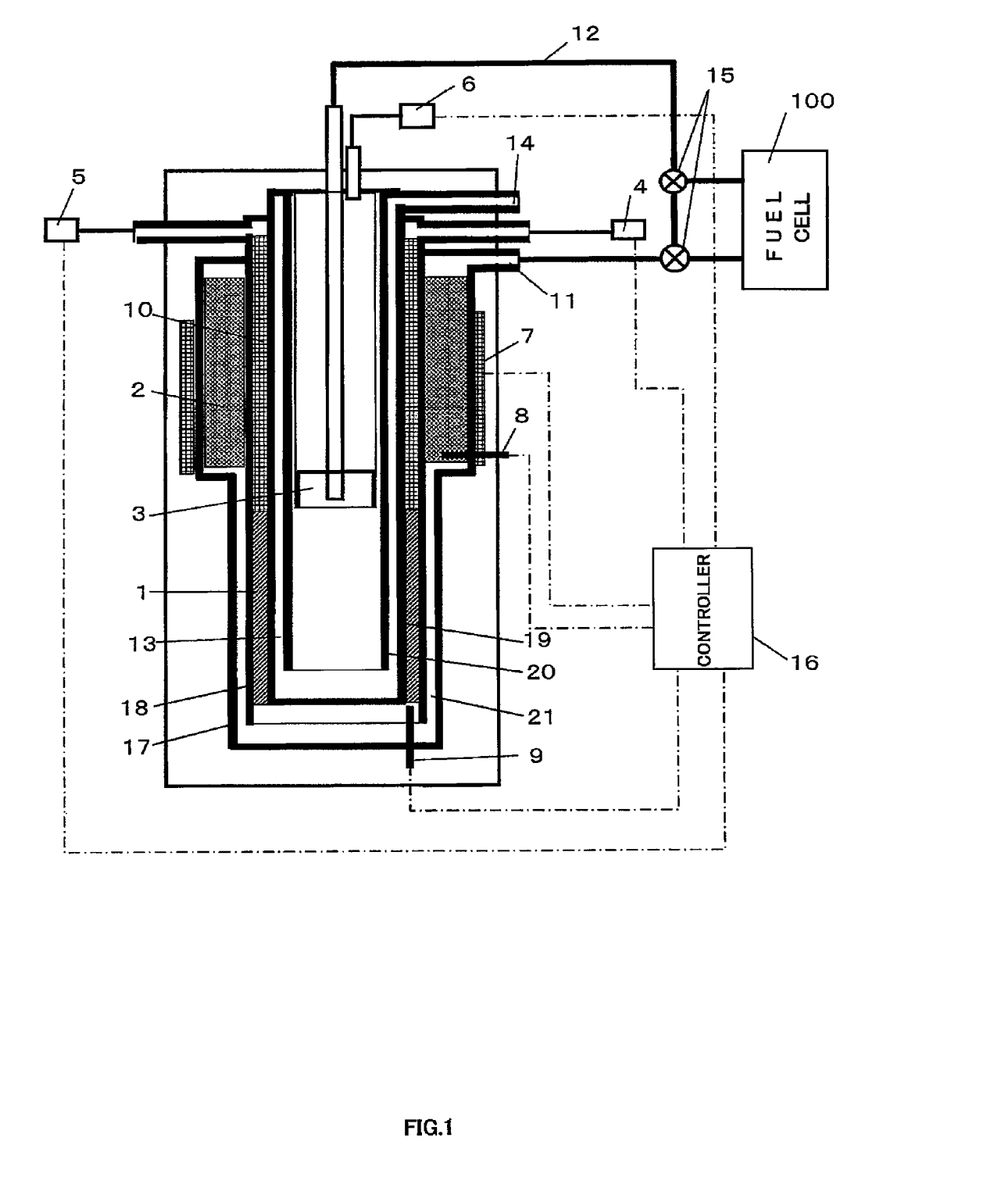
FIG. 1 is a diagrammatic view schematically showing a configuration of a hydrogen generator constructed according to a first embodiment of the invention.

FIG. 1 is a diagrammatic view showing a schematic configuration of a hydrogen generator constructed according to a first embodiment of the invention.

As shown in FIG. 1, the hydrogen generator of the first embodiment of the invention includes a reforming catalyst layer 1, a CO removing catalyst layer 2, a burner (combustor) 3, a material supply device 4, a water supply device 5, a CO removing heater (heater) 7, a CO removing temperature detector 8, a reforming temperature detector 9, a water evaporating mixer (evaporator) 10, and a controller 16. The controller 16 is configured to allow the CO removing heater 7 to heat the CO removing catalyst layer 2 at the time of start-up. When the temperature detected by the CO removing temperature detector 8 becomes greater than or equal to a first specified value, the controller 16 allows the burner 3 to heat the reforming catalyst layer 1 and the CO removing catalyst layer 2. When the temperature detected by the reforming temperature detector 9 becomes greater than or equal to a second specified value, the controller 16 allows the water supply device 5 to start supplying of water.

Specifically, the hydrogen generator of the first embodiment has a stepped outer cylinder 17, an intermediate cylinder 18 and an inner cylinder 19 which have a common central axis. Provided inside the inner cylinder 19 is a radiant cylinder 20 that is coaxial with the inner cylinder 19. Provided inside the radiant cylinder 20 is the burner 3. Thus, the hydrogen generator of the first embodiment is of a multiple cylindrical structure. It should be noted the shapes of the outer cylinder 17, intermediate cylinder 18, inner cylinder 19 and radiant cylinder 20 may be cylindrical and their cross-sectional shapes may be circular, elliptical or polygonal.

A cylindrical space defined between the inner cylinder 19 and the radiant cylinder 20 constitutes a combustion gas flow passage 13. Connected to the upper portion of the inner cylinder 19 is a conduit pipe for discharging combustion gas outwardly from the hydrogen generator, which combustion gas has flown from the combustion gas flow passage 13. The downstream end of this conduit pipe constitutes an exhaust gas outlet port 14.

The upper portion of a cylindrical space defined between the intermediate cylinder 18 and the outer cylinder 17 constitutes a water evaporating mixer 10, whereas the lower portion of the cylindrical space defined between the intermediate cylinder 18 and the outer cylinder 17 constitutes the reforming catalyst layer 1. Specifically, the reforming catalyst layer 1 is located on the downstream side of the water evaporating mixer 10.

The reforming catalyst layer 1 is filled with a reforming catalyst. As the reforming catalyst, there may be used substances which can serve as a catalyst in a steam reforming reaction occurring between the material and steam, generating hydrogen-containing gas. Examples of the reforming catalyst include ruthenium-based catalysts and nickel-based catalysts. The ruthenium-based catalysts are composed of a catalyst carrier such as alumina and ruthenium (Ru) carried by the catalyst carrier. The nickel-based catalysts are composed of a similar catalyst carrier and nickel (Ni) carried by the catalyst carrier. In addition, precious metals such as rhodium (Rh) and platinum (Pt) may be used as the reforming catalyst. It is desirable in view of cost reduction to use, as the reforming catalyst, nickel-based catalysts that contain nickel as a catalytic metal.

The reforming temperature detector 9 is disposed more downstream than the outlet port of the reforming catalyst layer 1. In this embodiment, the reforming temperature detector 9 detects the temperature of the reformed gas discharged from the reforming catalyst layer 1 to output to the controller 16 as the temperature of the reforming catalyst layer 1. Although the first embodiment is described in the context of a configuration in which the temperature of the reforming catalyst layer 1 is indirectly detected, it is apparent that the invention is not necessarily limited to this but may be configured to directly detect the temperature of the reforming catalyst layer 1.

The material supply device 4 and the water supply device 5 are each connected to the upper portion of the intermediate cylinder 18 through an appropriate conduit pipe. This makes it possible to supply the water evaporating mixer 10 with the material fed from the material supply device 4 and water fed from the water supply device 5.

In addition, the lower portion of a cylindrical space defined between the outer cylinder 17 and the intermediate cylinder 18 constitutes a reformed gas flow passage 21 through which the reformed gas generated by the reforming catalyst layer 1 flows. The upper portion (the portion above the reformed gas flow passage 21) of the cylindrical space defined between the outer cylinder 17 and the intermediate cylinder 18 constitutes the CO removing catalyst layer 2. The CO removing catalyst layer 2 is filled with a catalyst such as a shift reaction catalyst or selective oxidation catalyst. The CO removing catalyst layer 2 is provided with the CO removing temperature detector 8 for detecting the internal temperature of the CO removing catalyst layer 2. Although the first embodiment is described in the context of a configuration in which the CO removing temperature detector 8 directly detects the temperature of the CO removing catalyst layer 2, the invention is not necessarily limited to this but may be configured to indirectly detect the internal temperature of the CO removing catalyst layer 2 by detecting the temperature of the gas discharged from the outlet port of the CO removing catalyst layer 2.

The CO removing heater 7 is disposed on the outer periphery of the region of the outer cylinder 17 where the CO removing catalyst layer 2 is located. As the CO removing heater 7, an electric heater, for instance, may be used. Although the first embodiment is described with the CO removing heater 7 disposed outside the CO removing catalyst layer 2, the invention is not limited to this. The CO removing heater 7 may be disposed within the CO removing catalyst layer 2 or disposed more medially than the CO removing catalyst layer 2.

A proper conduit pipe is connected to the upper portion of the outer cylinder 17. The downstream end of this conduit pipe constitutes a produced gas outlet port 11 to which the upstream end of a return flow passage 12 is connected. The downstream end of the return flow passage 12 is connected to the burner 3.

A transfer valve 15 is provided at a position along the return flow passage 12, and by switching the transfer valve 15, the gas which has been fed from the produced gas outlet port 11 to the return flow passage 12 is supplied to the burner 3 after passing through the fuel cell 100.

An air supply device 6 is connected to the burner 3 through a proper conduit pipe. With this arrangement, the material, fed from the material supply device 4 to the water evaporating mixer 10 of the hydrogen generator, passes through the water evaporating mixer 10, the reforming catalyst layer 1, the reformed gas flow passage 21 and the CO removing catalyst layer 2. Subsequently, the material goes to the return flow passage 12 through the produced gas outlet port 11 and is then fed to the burner 3. The material fed to the burner 3 is combusted with air supplied from the air supply device 6. While flowing in the combustion gas flow passage 13, the combustion gas produced by the combustion heats the reforming catalyst layer 1 through heat transmission. Thereafter, the combustion gas heats the water evaporating mixer 10 and the CO removing catalyst layer 2. The combustion gas, which has passed through the combustion gas flow passage 13, is let out of the hydrogen generator through the exhaust gas outlet port 14.

The controller 16 may take any form as long as it can control the components of the hydrogen generator and is provided, for example, with an arithmetic processing unit such as a microprocessor or CPU and a storage unit constituted by a memory or the like for storing control execution programs. In addition, not only may the controller 16 be constituted by a single controller but it may take the form of a group of controllers that cooperate to execute operations to control the hydrogen generator. The controller 16 may be constituted by a microcontroller or alternatively constituted by a MPU, PLC (programmable logic controller), logic circuit, etc.

Turning to FIG. 1, the material gas fed from the material supply device 5 goes out through the produced gas outlet port 11 and is then supplied to the burner 3 disposed at the center of the hydrogen generator by way of the return flow passage 12. In the burner 3, the air fed from the air supply device 6 and the material gas flowing from the return flow passage 12 are mixed thereby forming a flame. The combustion gas generated by the flaming in the burner 3 flows in the combustion gas flow passage 13 defined between the two cylindrical structural elements and, thereafter, is discharged outwardly from the hydrogen generator through the exhaust gas outlet port 14.

Disposed around the outer periphery of the combustion gas flow passage 13 are the water evaporating mixer 10 and the annular reforming catalyst layer 1 filled with a Ni-containing reforming catalyst, which are adjacent to each other and configured to be heated by the combustion gas flowing in the combustion gas flow passage 13. The water evaporating mixer 10 evaporates the water fed from the water supply device 5 to mix with the material gas fed from the material supply device 4, thereby producing a mixed gas to be fed to the reforming catalyst layer 1 located under the water evaporating mixer 10.

The reformed gas from the reforming catalyst layer 1 is fed to the annular CO removing catalyst layer 2 that is adjacently disposed around the outer periphery of the water evaporating mixer 10 and filled with a CO removing catalyst. The produced gas coming out of the CO removing catalyst layer 2 is discharged outwardly from the hydrogen generator through the produced gas outlet port 11 and is subsequently fed to the burner 3 by way of the return flow passage 12, as described earlier. The return flow passage 12 is provided with the transfer valve 15 that switches the return flow passage 12 so as to be communicated with the fuel cell 100. The cylindrical structural element surrounding the outer periphery of the CO removing catalyst layer 2 is provided with the CO removing heater 7. Further, the CO removing temperature detector 8 for detecting the temperature of the CO removing catalyst layer 2 and the reforming temperature detector 9 for detecting the temperature of the reforming catalyst layer 1 are provided. Signals issued from the CO removing temperature detector 8 and the reforming temperature detector 9 are transmitted to the controller 16 to control the material supply device 4, the water supply device 5, the air supply device 6 and the CO removing heater 7.

The material supply device 4, the water supply device 5 and the air supply device 6 described herein can control the flow rates of their associated substances to be supplied (i.e., material gas, water and air), respectively. They may be respectively constituted by a supply device pump capable of changing the discharge rate of the substance to be supplied. Alternatively, they may be constituted by a flow control mechanism that is made up of a combination of a substance supply source and a flow regulating valve that is provided in the downstream flow passage, for controlling the flow rate of the substance to be supplied.

The CO removing catalyst layer 2 may cause the shift reaction in the presence of the shift reaction catalyst, or may cause the selective oxidation reaction in the presence of the selective oxidation catalyst after supplying and mixing of oxygen. Also, it may cause both of these reactions in combination.

Examples of the shift reaction catalyst, which fills the CO removing catalyst layer 2, include precious metals such as platinum (Pt), Fe—Cr-based catalysts, Cu—Zn-based catalysts and others. As the selective oxidation catalyst, substances containing platinum (Pt), ruthenium (Ru), rhodium (Rh) or the like may be used.

Examples of the material (gas) include hydrocarbon-based fuels such as city gas (natural gas) and LPG.

[Operation of Hydrogen Generator]

Figure 2:
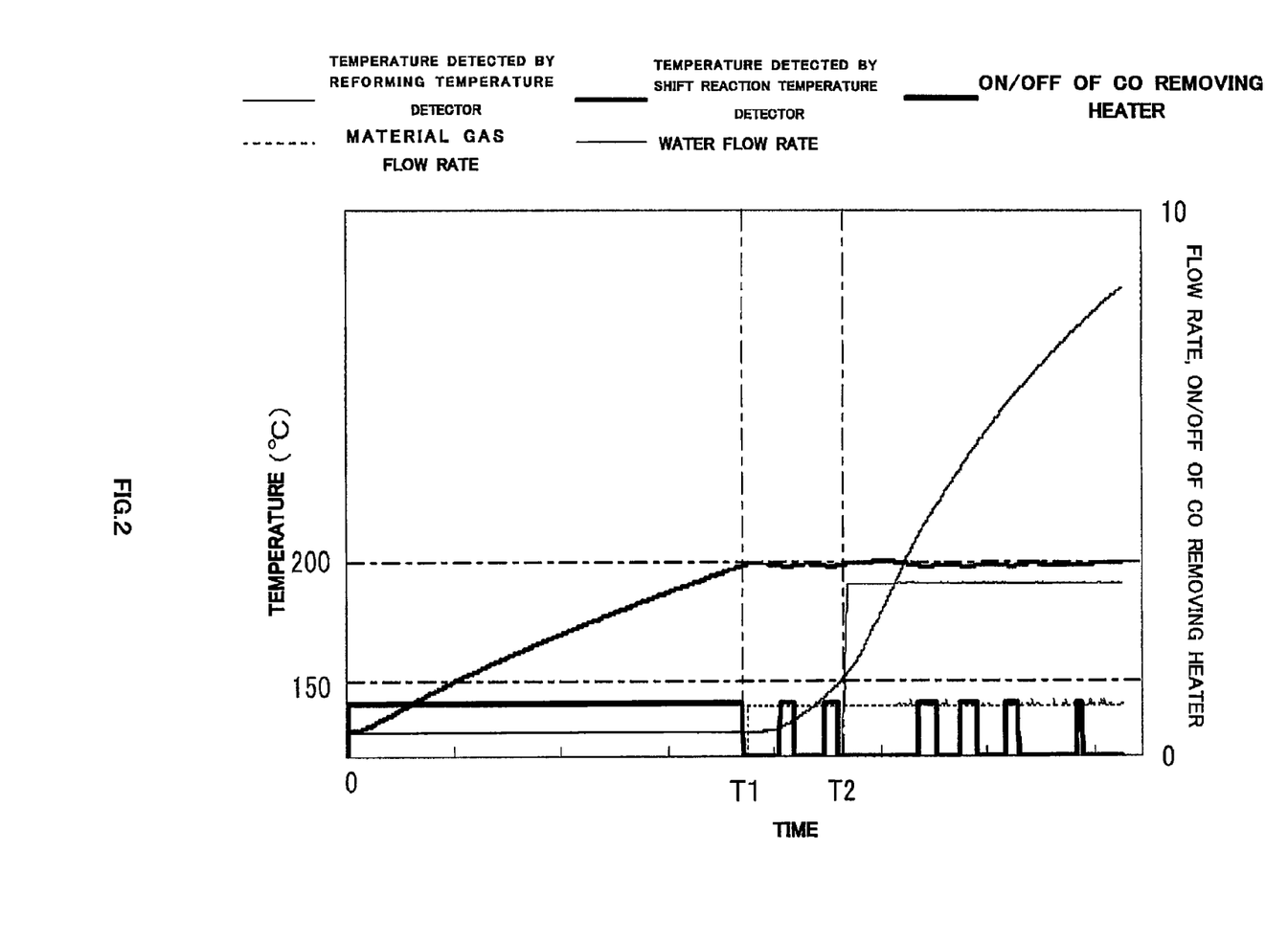
FIG. 2 is a graph showing the temperatures of components, the flow rates of material gas and water, and the control state of a CO removing heater during start-up of the hydrogen generator shown in FIG. 1.

Next, reference is made to FIG. 2 to describe the operation of the hydrogen generator according to the first embodiment having the above-described configuration. Herein, FIG. 2 is a graph showing the condition of each component at the time of start-up. In FIG. 2, the horizontal axis represents time elapsing after start-up, whereas the vertical axis represents the operational state of the CO removing heater 7, the flow rate of the material gas from the material supply device 4, the flow rate of water from the water supply device 5, and changes in the detection temperatures of the reforming temperature detector 9 and the CO removing temperature detector 8.

During start-up, the controller 16 turns (energizes) the CO removing heater 7 ON to raise the temperature of the CO removing heater 7 thereby to raise the temperature of the CO removing catalyst layer 2 that is located on the inner side of the structural element on which the CO removing heater 7 is mounted. After the CO removing temperature detector 8 determines by detecting a first specified value (e.g., 200° C.) that the CO removing catalyst layer 2 has come into a specified temperature state, the controller 16 allows the material supply device 4 to start supplying of the material gas (time T1 in FIG. 2). The material gas, which has passed through the hydrogen generator, comes out through the produced gas outlet port 11 and is, then, fed to the burner 3 by way of the return flow passage 12. In the burner 3, the air fed from the air supply device 6 and the material gas are mixed and high-voltage electricity is discharged (not shown), thereby forming a flame in the burner 3. The "specified temperature state" stated herein, at which supplying of the material gas starts, is a condition in which the temperature of the CO removing catalyst layer 2 is so high that steam condensation does not occur even if vapor-containing gas flows in the CO removing catalyst layer 2.

The combustion gas having high temperature flows from the burner 3 to the combustion gas flow passage 13, so that heat is transmitted, thereby raising the temperature of the reforming catalyst layer 1 and the water evaporating mixer 10. After the reforming temperature detector 9 determines by detecting a second specified value (e.g., 150° C.) that the reforming catalyst layer 1 and the water evaporating mixer 10 have come into a specified temperature state, the water supply device 5 is allowed to start supplying of water (time T2 in FIG. 2).

The "specified temperature state" of the reforming catalyst layer 1 and water evaporating mixer 10, stated herein, is a temperature condition in which the temperature of the water evaporating mixer 10 and the reforming catalyst layer 1 is sufficiently high so that satisfactory evaporation takes place in the water evaporating mixer 10 even if it is supplied with water and no steam condensation occurs in the reforming catalyst layer 1 even if it is supplied with vapor-containing gas. With this arrangement, the water evaporating mixer 10 can generate steam by evaporating water and mixes the steam with the material gas fed from the material supply device 4 to supply to the reforming catalyst layer 1 as mixed gas. The reforming catalyst layer 1 allows the vapor-containing mixed gas to flow therein without causing steam condensation so that the mixed gas is fed from the reforming catalyst layer 1 to the CO removing catalyst layer 2.

Since the CO removing catalyst layer 2 also has such temperature as to cause no steam condensation, the mixed gas goes out through the produced gas outlet port 11 after passing through the CO removing catalyst layer 2 without incurring steam condensation. Then, the mixed gas is supplied from the return flow passage 12 to the burner 3 where the mixed gas is to be combusted, generating combustion gas. The combustion gas passes through the combustion gas flow passage 13. The reforming catalyst layer 1 further rises in temperature owing to the combustion gas passing through the combustion gas flow passage 13. After the reforming catalyst layer 1 has reached a temperature (e.g., 600 to 700° C.) at which the reforming catalyst causes the steam reforming reaction, the steam reforming reaction takes place in accordance with the catalyst temperature within the reforming catalyst layer 1. In the steam reforming reaction, carbon monoxide and carbon dioxide are generated together with hydrogen and they are mixed thereby producing reformed gas. After the reformed gas is fed from the reforming catalyst layer 1 to the CO removing catalyst layer 2, the concentration of carbon monoxide contained in the reformed gas decreases to 10 ppm or less, by causing the shift reaction between the carbon monoxide and the steam in the presence of the shift reaction catalyst and causing the selective oxidation reaction in the presence of the selective oxidation catalyst by use of oxygen which has been supplied.

In the first embodiment, the CO removing heater 7 is firstly turned ON immediately after start-up to raise the temperature of the CO removing catalyst layer 2 for the reason that the CO removing catalyst layer 2 is generally used in a larger amount compared to the reforming catalyst layer 1 and, therefore, a substantial amount of heat is necessary for raising the temperature of the CO removing catalyst layer 2. For instance, in cases where the quantity of the CO removing catalyst is 5 to 10 times that of the reforming catalyst, the thermal capacity of the former is also 5 to 10 times that of the latter.

When heating the temperature of the CO removing catalyst layer 2 with the heat transmitted from the combustion gas of the burner 3 under the above conditions, the CO removing catalyst layer 2 is heated through the combustion gas flow passage 13. Since the water evaporating mixer 10 is disposed between the CO removing catalyst layer 2 and the combustion gas flow passage 13, the temperature of the water evaporating mixer 10 is firstly raised by the combustion gas and then the CO removing catalyst layer 2 is heated by the heat of the water evaporating mixer 10 which has risen in temperature. Such indirect heating of the layer having high thermal capacity takes a considerably long time. While expending a lot of time in heating, the combustion gas continues to flow in the combustion gas flow passage 13 so that the reforming catalyst layer 1 is also continuously heated together with the water evaporating mixer 10.

With this, if the catalyst temperature exceeds a reference temperature (e.g., 300° C.) with the reforming catalyst layer 1 being supplied with the material gas alone, carbon deposition will occur. Such carbon deposition brings about the possibility of a decrease in catalyst strength and catalyst performance. Therefore, the CO removing catalyst layer 2 must be heated under the condition that the temperature rise of the reforming catalyst layer 1 is restricted to inhibit the temperature of the reforming catalyst provided in the reforming catalyst layer 1 from exceeding the reference temperature.

To this end, the first embodiment is designed as follows. Prior to heating of the reforming catalyst layer 1 through operation of the burner 3, the temperature of the CO removing catalyst layer 2 is raised by the CO removing heater 7 from the outside thereof such that the reforming catalyst layer 1 is not heated while the CO removing catalyst layer 2 being heated by the CO removing heater 7.

After the controller 16 determines through detection by the CO removing temperature detector 8 that the temperature of the CO removing catalyst layer 2 has reached the first specified value at which steam condensation does not occur even if steam is fed to the CO removing catalyst layer 2, the material supply device 5 starts supplying of the material gas. Since the reforming catalyst layer 1 has not been directly heated yet by the CO removing heater 7 and the burner 3 has not been put into operation, the catalyst temperature is lower than the reference temperature (e.g., 300° C.) at which carbon deposition starts to occur. Therefore, carbon deposition in the reforming catalyst layer 1 is not entailed by supplying the material gas to the reforming catalyst layer 1. Thus, flame formation in the burner 3 is enabled without causing catalyst degradation when supplying the material gas.

After flame is formed in the burner 3, the combustion gas generated in the burner 3 flows in the combustion gas flow passage 13. While the combustion gas flowing through the combustion gas flow passage 13, the heat of the combustion gas is transmitted to the reforming catalyst layer 1 and the water evaporating mixer 10 so that they rise in temperature. After the temperature of the reforming catalyst layer 1 has reached the second specified value at which water evaporates in the water evaporating mixer 10 and steam condensation does not occur in the reforming catalyst layer 1, the water supply device 5 starts supplying of water to cause the steam reforming reaction in the reforming catalyst layer 1 and the CO removing reaction in the CO removing catalyst layer 2.

Accordingly, the hydrogen generator of the first embodiment is configured such that, prior to heating by the burner 3, the CO removing heater 7 heats the CO removing catalyst layer 2 which has high heat capacity and is therefore difficult to heat by the burner 3. This enables it to inhibit heating of the reforming catalyst layer 1 to high temperature. In addition, the inhibition of heating of the reforming catalyst layer 1 to high temperature prevents carbon deposition in the reforming catalyst layer 1 caused by supplying of the material gas.

In the hydrogen generator of the first embodiment, when the temperature of the CO removing catalyst layer 2 becomes greater than or equal to the first specified value, the reforming catalyst layer 1 and the CO removing catalyst layer 2 are heated by the burner 3, which eliminates the need to frequently turn the burner 3 ON and OFF and, in consequence, the reforming catalyst layer 1 can be heated in a stable condition. When the temperature of the reforming catalyst layer 1 becomes greater than or equal to the second specified value, the water supply device 5 starts supplying of water so that not only water leakage in the reforming catalyst layer 1 and the CO removing catalyst layer 2 but also carbon deposition can be restricted.

With the above arrangement, the hydrogen generator of the first embodiment can provide improved durability and stable start-up. In addition, carbon deposition in the reforming catalyst layer 1 and the CO removing catalyst layer 2 can be inhibited in the hydrogen generator of the invention, even in cases where a catalyst having a low carbon deposition temperature such as nickel-based catalysts is used as the reforming catalyst that fills the reforming catalyst layer 1.

As seen from FIG. 2, the controller 16 controls the CO removing heater 7 throughout the start-up period such that the CO removing heater 7 is turned ON if the temperature detected by the CO removing temperature detector 8 is lower than 200° C. and turned OFF if the detected temperature is higher than 200° C. The control process is not necessarily limited to this. Any other control processes may be adopted as long as the CO removing catalyst layer 2 can be set in a temperature condition where no steam condensation occurs, when the CO removing catalyst layer 2 is supplied with steam after the water supply device 5 has started supplying of water. For instance, the control may be performed such that the CO removing heater 7 is turned OFF upon flame formation in the burner 3 which is supplied with the material gas from the material supply device 4 subsequently to detection of a specified temperature by the CO removing temperature detector 8, and the CO removing heater 7 is not turned ON afterwards.

Any type of heater can be used as the CO removing heater 7 as long as it can heat the CO removing catalyst layer 2. Examples of the CO removing heater 7 include ceramic heaters, sheet heaters and sheathed heaters that are installed on the outer surface of the structural element when used, which structural element covers the CO removing catalyst layer 2.

In cases where a temperature rise in the reforming catalyst layer 1 and water evaporating mixer 10 which are heated by the burner 3 is detected by the reforming temperature detector 9 and water supplying is started by the water supply device 5, the water supplying may be started immediately after detection of the second specified value (e.g., 150° C.) by the reforming temperature detector 9 as described earlier. Alternatively, the water supplying may be started after the reforming catalyst layer 1 and the structural element surrounding it have been brought into a condition where no steam condensation occurs at all, by further raising the temperature of the reforming catalyst layer 1 and the water evaporating mixer 10 and by further enhancing the evaporating ability of the water evaporating mixer 10. It should be noted that the water supplying needs to be started before carbon deposition caused by the supply of the material gas alone occurs in the reforming catalyst layer 1 (i.e., before the catalyst temperature reaches 300° C. in cases where a Ni-containing reforming catalyst is employed). That is, the water supply device 5 may be designed to start water supplying if the temperature detected by the reforming temperature detector 9 is greater than the second specified value (e.g., 150° C.) and not greater than the third specified value (e.g., 300° C.).

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The hydrogen generator and its start-up method according to the invention are useful in the field of fuel cells, because they are capable of providing improved durability and stable start-up by inhibiting water leakage and carbon deposition that could occur in the reforming catalyst layer and the CO removing catalyst layer during start-up.

The invention claimed is:

1. A hydrogen generator comprising:
a material supply device for supplying material;
a water supply device for supplying water;
an evaporator for evaporating the water fed from said water supply device thereby to produce steam;
a reforming catalyst layer having a reforming catalyst for generating hydrogen-containing reformed gas through a reforming reaction using said material and said steam;
a CO removing catalyst layer configured to reduce the amount of carbon monoxide contained in said reformed gas generated by said reforming catalyst layer;
a combustor for heating said reforming catalyst layer and said CO removing catalyst layer;
a reforming temperature detector for detecting the temperature of said reforming catalyst layer;
a heater for heating said CO removing catalyst layer;
a CO removing temperature detector for detecting the temperature of said CO removing catalyst layer; and
a controller configured to perform control such that said heater heats said CO removing catalyst layer at the time of start-up, and such that if the temperature detected by said CO removing temperature detector becomes greater than or equal to a first specified value, said combustor heats said reforming catalyst layer and said CO removing catalyst layer, and if the temperature detected by said reforming temperature detector becomes greater than or equal to a second specified value, said water supply device starts supplying of water.

2. The hydrogen generator according to claim 1, wherein said controller allows said water supply device to start supplying of water if the temperature detected by said reforming temperature detector is not lower than the second specified value and not greater than a third specified value.

3. The hydrogen generator according to claim 1, which is of a multiple cylindrical structure,
wherein said evaporator is disposed in a space adjacent to the external side of a combustion gas flow passage through which combustion gas from said combustor flows;
wherein said reforming catalyst layer is disposed on the downstream side of said evaporator; and
wherein said CO removing catalyst layer is disposed in a space adjacent to the external side of said evaporator.

4. The hydrogen generator according to claim 1, wherein said reforming catalyst contains nickel.

5. A start-up method for a hydrogen generator which comprises:
a material supply device for supplying material;
a water supply device for supplying water;
an evaporator for evaporating the water fed from said water supply device thereby to produce steam;
a reforming catalyst layer having a reforming catalyst for generating hydrogen-containing reformed gas through a reforming reaction using said material and said steam;
a CO removing catalyst layer configured to reduce the amount of carbon monoxide contained in said reformed gas generated by said reforming catalyst layer;
a combustor for heating said reforming catalyst layer and said CO removing catalyst layer;
a reforming temperature detector for detecting the temperature of said reforming catalyst layer;
a heater for heating said CO removing catalyst layer; and
a CO removing temperature detector for detecting the temperature of said CO removing catalyst layer;
wherein said heater heats said CO removing catalyst layer at the time of start-up; said combustor heats said reforming catalyst layer and said CO removing catalyst layer if the temperature detected by said CO removing temperature detector becomes greater than or equal to a first specified value; and said water supply device starts supplying of water if the temperature detected by said reforming temperature detector becomes greater than or equal to a second specified value.

6. The hydrogen generator according to claim 5,
wherein said water supply device starts supplying of water if the temperature detected by said reforming temperature detector is not lower than the second specified value and not greater than a third specified value.

7. The hydrogen generator according to claim 5, wherein said reforming catalyst contains nickel.

* * * * *